United States Patent
May

(10) Patent No.: US 11,046,383 B2
(45) Date of Patent: Jun. 29, 2021

(54) MOTORCYCLE FOOTREST MOUNT

(71) Applicant: Ciro, LLC, Hudson, WI (US)

(72) Inventor: Darron B. May, Stillwater, MN (US)

(73) Assignee: CIRO CORPORATION, Hudson, WI (US)

(*) Notice: Subject to any disclaimer, the term of this patent is extended or adjusted under 35 U.S.C. 154(b) by 202 days.

(21) Appl. No.: 16/521,190

(22) Filed: Jul. 24, 2019

(65) Prior Publication Data

US 2021/0024161 A1    Jan. 28, 2021

(51) Int. Cl.
    *B62J 25/00* (2020.01)
    *B62J 27/00* (2020.01)
(52) U.S. Cl.
    CPC ............... *B62J 25/00* (2013.01); *B62J 27/00* (2013.01)
(58) Field of Classification Search
    CPC ......................................................... B62J 25/00
    See application file for complete search history.

(56) References Cited

U.S. PATENT DOCUMENTS

| 3,794,353 | A  | * | 2/1974  | Oliver   | B62J 25/00 280/291 |
| 5,779,254 | A  | * | 7/1998  | James    | B62J 25/00 180/219 |
| 7,104,157 | B1 | * | 9/2006  | Hilliard | B62J 25/00 280/291 |
| 8,181,982 | B1 | * | 5/2012  | Ward     | B62J 25/00 280/291 |
| 2007/0057484 | A1 | * | 3/2007 | Gilman  | B62J 25/00 280/291 |
| 2008/0185208 | A1 | * | 8/2008 | May     | B60N 3/063 180/291 |
| 2015/0217826 | A1 | * | 8/2015 | Parvey  | B62J 25/00 280/291 |
| 2019/0315429 | A1 | * | 10/2019 | Laberge | B62J 25/00 |
| 2021/0024162 | A1 | * | 1/2021 | Lindloff | B62J 25/06 |

* cited by examiner

*Primary Examiner* — Tony H Winner
(74) *Attorney, Agent, or Firm* — Dicke, Billig & Czaja, PLLC

(57) ABSTRACT

A motorcycle footrest mount is attachable to a motorcycle adjacent an engine of the motorcycle where a motorcycle frame includes a mount or attaching a crash bar to the motorcycle frame. The footrest mount includes a body that connects to the motorcycle frame mount and a clam shell clamp that connects to a portion of the crash bar. A mounting arm connected to the body carries an adjustable mounting member that is configured to mount a footrest assembly.

12 Claims, 5 Drawing Sheets

US 11,046,383 B2

MOTORCYCLE FOOTREST MOUNT

BACKGROUND

The Honda Goldwing motorcycle includes a protective bar mounted to the motorcycle frame at spaced locations on each side of the motorcycle frame to aid in keeping the engine from contacting the ground in the event the side of the motorcycle contacts the ground. The rear-most mounting location on the motorcycle frame for the protective bar is between the exhaust pipes. In some models, the engine and bar are surrounded by an aesthetic cover, which corresponds to the seating area of a motorcycle operator. It would be beneficial to be able to mount a footrest below the motorcycle seating area for the motorcycle operator.

DETAILED DESCRIPTION

Figure 1:
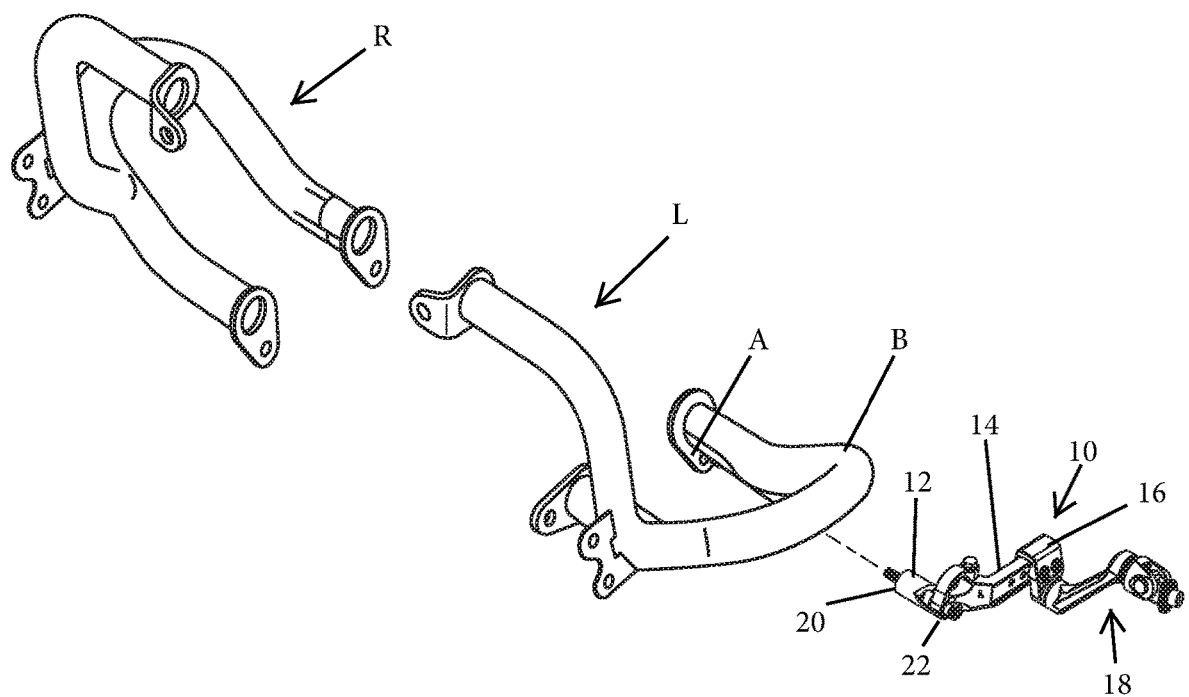
FIG. 1 is an exploded perspective view of a pair of motorcycle crash bars and footrest mount as oriented when mounted to a motorcycle frame.

FIG. 1 is a left front perspective diagrammatic view of the left and right crash bars L and R, respectively, as oriented when mounted to a motorcycle frame, with a footrest mount 10 exploded from a rear-most mounting flange A of the left side crash bar B, which attaches to the motorcycle frame with a threaded connector (not shown). Footrest mount 10 generally includes a mounting body 12, a mounting arm 14 connected to the mounting body 12, and an adjustable mounting member 16 connected to mounting arm 14 for connecting a footrest assembly 18. Mounting body 12, mounting arm 14 and adjustable mounting member 16 are formed from stainless steel in an investment casting process. In one embodiment, mounting body 12 comprises a linear body with a first end 20 and a second end 22 spaced from first end 20. Mounting arm 14 is integrally connected to second end 22 and extends generally normal to body 12 in a rearward direction relative to mounting flange A of the crash bar L as shown in FIG. 1. The footrest mount 10 for the right side of the motorcycle is a mirror image of the footrest mount 10 shown in FIG. 1.

Figure 2:
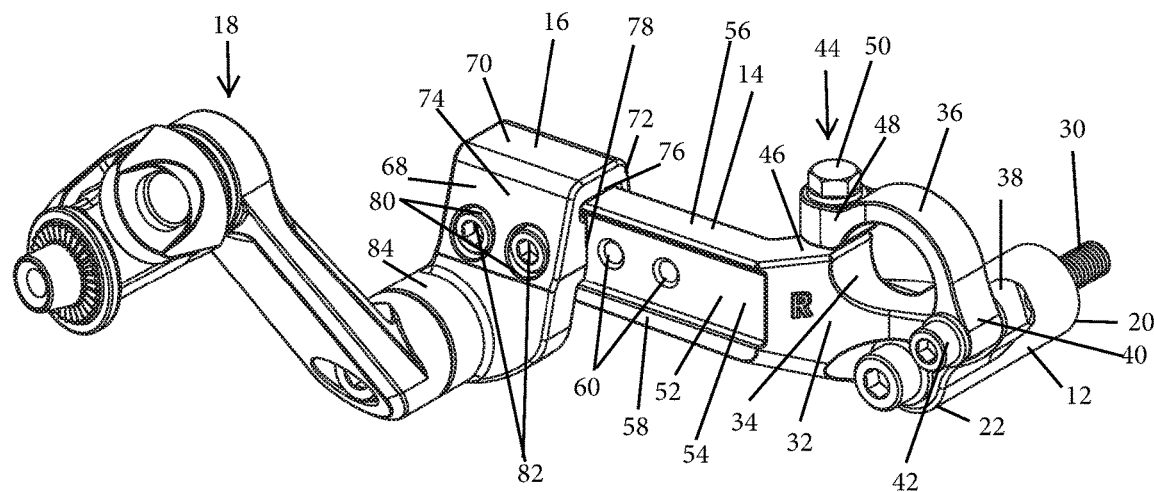
FIG. 2 is a front perspective view of a footrest mount for a right side of a motorcycle.
Figure 5:
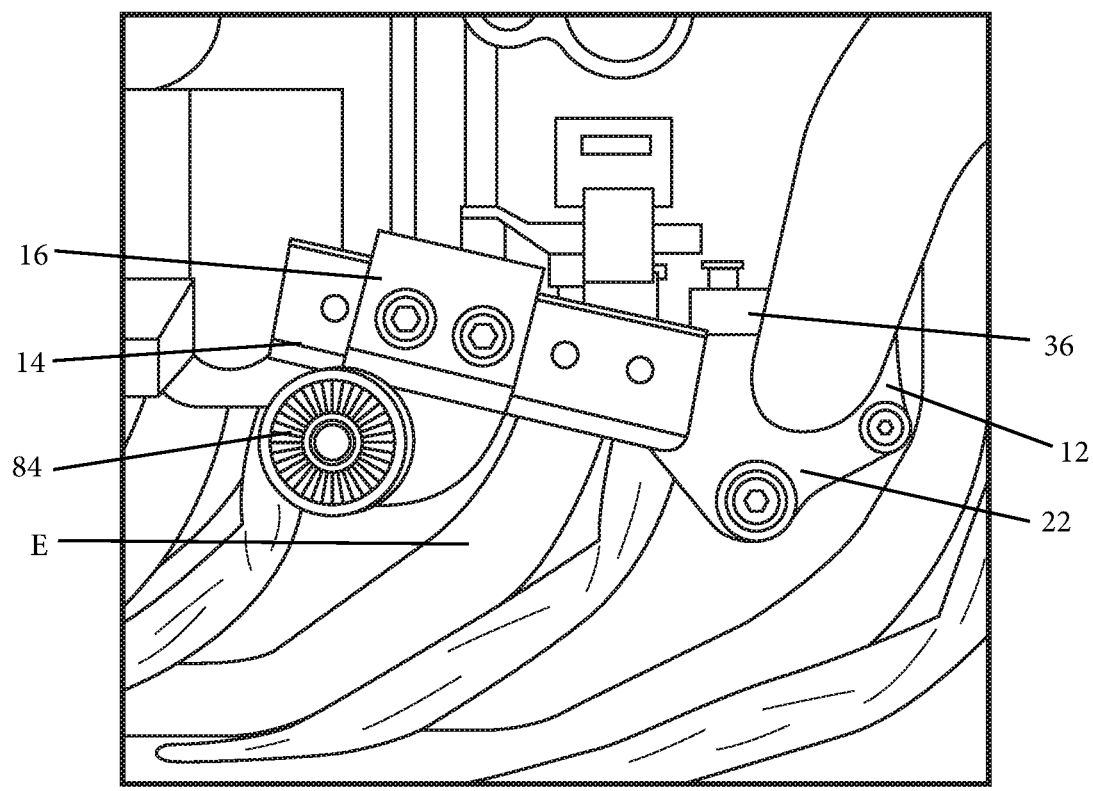
FIG. 5 is the diagrammatic side view of FIG. 4 with the footrest mount connected to the motorcycle frame and the crash bar.

FIG. 2 is a front perspective view of footrest mount 10 for the right side of a motorcycle. As shown in FIG. 2, in one embodiment, mounting body 12 is a cylindrical body configured with a bore 29 (FIG. 3) to receive a threaded connector 30 for mounting footrest mount 10 to an internally threaded bore on the motorcycle frame that mounts flange A of crash bar L (FIG. 1). Mounting body 12 has a length between ends 20 and 22 sufficient to space mounting arm 14 from free end 20 a distance that provides clearance between mounting arm 14 and the exhaust pipes E of the motorcycle engine when footrest mount 10 is connected to the motorcycle frame (FIG. 5). The mounting body 12 includes a transition body 32 that extends transversely to the bore of mounting body 12 and connects to mounting arm 14. The transition body 32 includes a curved upper surface 34 which cooperates with a curved clamp 36 connectable between second end 22 of body 12 and transition body 32 to form a clam shell clamp. In one embodiment, mounting body 12 includes a first clamp mount 38 with an internally threaded bore that is generally parallel to the bore for threaded connector 30, and clamp 36 has a first end 40 that includes a bore that aligns with the bore of first clamp mount 38 to allow first end 40 to be connected to first clamp mount 38 with a threaded connector 42. In one embodiment, transition body 32 includes a second clamp mount 44 formed by providing an internally threaded bore into transition body 32 through a top surface 46, and a second end 48 of clamp 36 is formed with a bore that aligns with the internally threaded bore of transition body 32 to allow second end 48 to be connected to transition body 32 with a threaded connector 50. The curved upper surface 34 of transition body 32 and the curved clamp 36 of footrest mount 10 are configured to mate with the outer surface of a portion of a crash bar (i.e., crash bars R and L) when footrest mount 10 is connected to the motorcycle frame, to attach footrest mount 10 to the crash bar.

Figure 3:
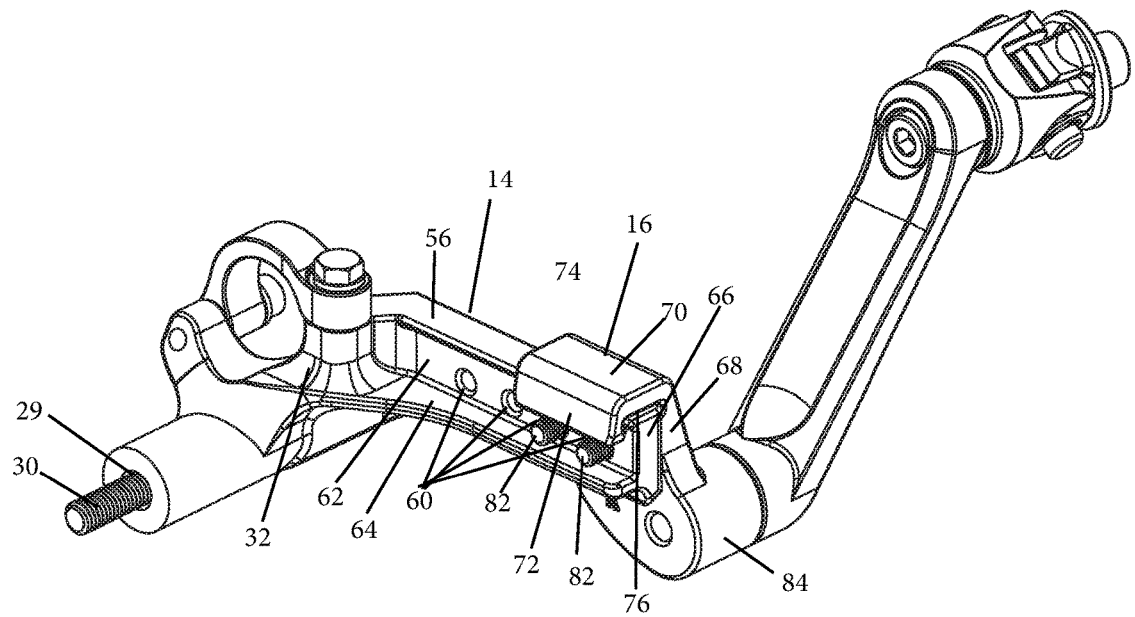
FIG. 3 is a rear perspective view of the footrest mount of FIG. 2.

In one embodiment, mounting arm 14 comprises an elongate metal bar 52 having a planar outer surface 54. In one embodiment, mounting arm 14 includes a top edge 56 that is wider than metal bar 52 to formed T-shaped rail on metal bar 52. In one embodiment, mounting arm 14 can also include a lower edge 58 formed to define a lip that extends generally normal to outer surface 54 of metal bar 52. As shown in FIGS. 2 and 3, Metal bar 52 can include one or more internally threaded openings 60 through metal bar 52 along the length of mounting arm 14 to connect the adjustable mounting member 16 at a desired location on mounting arm 14. As shown in FIG. 3, a rear surface 62 of metal bar 52 can further include a rib 64 along the length of the metal bar 52, below openings 60, and integrally connected to transition body 32 and metal bar 52. The mounting arm 14 terminates at a free end 66, which can allow connection of the adjustable mounting member 16 to mounting arm 14.

Adjustable mounting member 16 comprises a body configured for connection to the mounting arm 14. As shown in FIGS. 2 and 3, in one embodiment, the body of adjustable mounting member 16 is configured with first, second and third walls 68, 70 and 72, respectively having an outer surface 74, and an inner surface 76 that defines a T-shaped channel that mates with the T-shaped rail of metal bar 52. The channel of adjustable mounting member 16 and the rail of mounting arm 14 can be configured with other shapes, e.g., a dovetail. Alternatively, if metal bar 52 is configured without a rail, adjustable mounting member 16 can be configured to mate with the shape of metal bar 52. The inner surface 76 of wall 68 can further include an inner surface portion 78 that is configured to contact the planar outer surface 54 of metal bar 52, between the top edge 56 and the lower edge 58. Wall 68 includes one or more spaced openings 80 that extend from outer surface 74 to inner surface 76 that align with the one or more openings 60 in metal bar 52. In one embodiment, wall 68 is provided with two openings 80 that can align with two openings 60. Adjustable mounting member 16 is positioned on mounting arm 14 by sliding the T-shaped channel onto the T-shaped rail at the free end 66 of mounting arm 14. In the embodiment shown in FIGS. 2 and 3, when metal bar is provided with four or five spaced openings 60, the adjustable mounting member 16 can be located at different positions along mounting arm 14 where openings 80 align with openings 60, to allow the adjustable mounting member 16 to be secured to mounting arm 14 with threaded connectors 82. Attached to wall 68 below the inner surface portion 78 is a spline mount body 84 that extends transversely from wall 68 and comprises a conventional splined outer surface and internally threaded mounting bore for mounting a footrest assembly to the adjustable mounting member 16 in various radial orientations.

Figure 4:
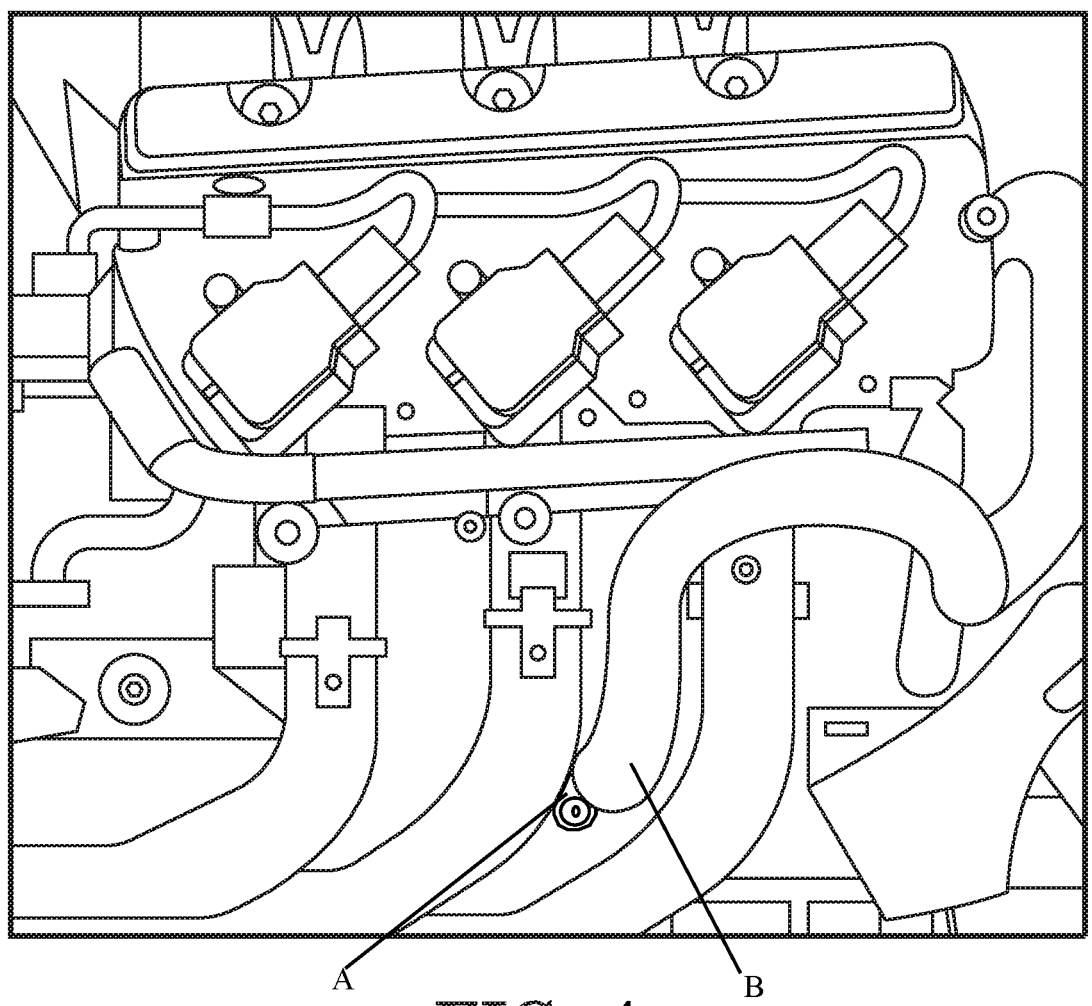
FIG. 4 is a diagrammatic side view of a motorcycle engine and crash bar carried on the motorcycle frame with a cover for the motorcycle engine and crash bar removed.
Figure 6:
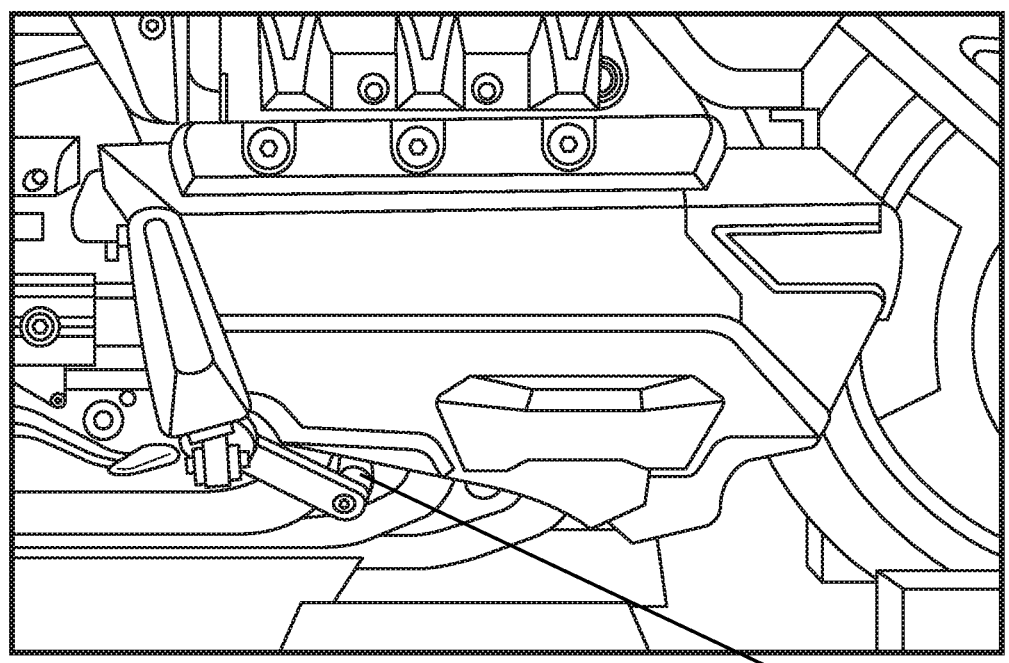
FIG. 6 is a diagrammatic side view of the cover mounted over the motorcycle engine and crash bar and a portion of the footrest mount unobstructed by the cover.

Footrest mount 10 is attached in the same manner on each side of a motorcycle below the aesthetic cover covering the engine and crash bar, with the mounting arm 14 locating the spline mount 84 at a location unobstructed by the aesthetic cover to permit attachment of a footrest assembly. To attach footrest mount 10 to the motorcycle, the aesthetic cover is removed to expose the rear-most mounting flange of the crash bar (e.g., mounting flange A of the left side crash bar B) (FIG. 4). The stock bolt connecting flange A to the motorcycle frame is then removed and inserted into the bore 29 of mounting body 12. With the curved clamp 36 removed, the stock bolt (i.e., threaded connector 30) is then re-inserted into the opening of flange A and is threaded into the stock frame mounting hole for flange A with the curved upper surface 34 of transition body 32 contacting the lower surface of crash bar L and the mounting arm 14 extending toward the rear end of the motorcycle. The curved clamp 36 is then positioned over the top surface of crash bar L and is attached to the first and second clamp mounts 38 and 44, respectively, to secure footrest mount 10 to the crash bar L (FIG. 5). Footrest mount 10 is thus attached to the motorcycle frame at a first location and to the crash bar at a second location spaced from the frame that supports footrest mount 10 relative to the motorcycle. The adjustable mounting member 16 is then attached to mounting arm 14 at a desired location with the spline mount body 84 unobstructed by the aesthetic cover (FIGS. 5 and 6).

Although the footrest mount has been described with reference to exemplary embodiments, workers skilled in the art will recognize that changes can be made in form and detail without departing from the spirit and scope of the disclosed mounting arm. Applicant intends that the examples described above do not limit the scope of application's invention, which is defined by the claims below. Applicant's descriptions are not intended to redefine the terms set forth in the claims unless applicant has expressly stated that a term means something different than the plain import of the terms.

What is claimed is:

1. A motorcycle footrest mount for connection to a motorcycle frame having a plurality of mounting holes for connecting a crash bar to the motorcycle frame, the footrest mount comprising:
   a metal body having a first end and a second end spaced from the first end, and a bore extending through the body from the first end to the second end, the bore sized to receive a threaded connector for connecting the first end of the metal body to one of the plurality of crash bar mounting holes on the motorcycle frame, the metal body further having a transition body at the second end of metal body, the transition body extending generally transverse to the bore of the metal body, the transition body configured to define a clam shell clamp having a first clamp portion on an upper surface of the transition body and a second clamp portion reversibly connectable to the first clamp portion, the first and second clamp portions defining a generally circular opening capable of receiving a portion of the crash bar;
   a mounting arm connected to the transition body and extending a length from the transition body to a free end, the mounting arm having a plurality of internally threaded mounting holes spaced along the mounting arm; and
   an adjustable mount having a body carried on the mounting arm and being connectable to the mounting arm at one or more locations along the length of the mounting arm, the adjustable mount configured for connection to a footrest assembly.

2. The motorcycle footrest mount of claim 1, wherein the mounting arm comprises a rail along a top edge of the mounting arm, and wherein the body of the adjustable mount comprises an outer surface and an inner surface, the inner surface configured to define a channel matable with the rail, the adjustable mount slideable along the rail to the one or more locations along the length of the mounting arm.

3. The motorcycle footrest mount of claim 2, wherein the rail comprises a T-shaped rail, and wherein the adjustable mount channel comprises a T-shaped channel.

4. The motorcycle footrest mount of claim 2, wherein the mounting arm includes a plurality of spaced mounting holes at the one of more locations along the length of the mounting arm, and wherein the adjustable mount includes one or more spaced mounting holes, the one or more mounting holes on the adjustable mount capable of aligning with the one or more mounting holes on the mounting arm, and one or more connectors for connecting the adjustable mount to the mounting arm through the respective one or more mounting holes of the mounting arm and the adjustable mount.

5. The motorcycle footrest mount of claim 1, wherein the adjustable mount further comprises a spline mount attached to the body.

6. A device for mounting a motorcycle footrest to motorcycle having a crash bar mounted to a crash bar mounting site on a motorcycle frame, the footrest mount comprising:
   a metal body having a first end and a second end spaced from the first end, and a bore extending through the body from the first end to the second end, the bore sized to receive a first connector for connecting the first end of the metal body to the crash bar mounting site on the motorcycle frame; and
   a mounting arm connected to the second end of the metal body and extending generally transverse from the metal body, the mounting arm having at least one aperture for connecting a foot rest assembly;
   wherein the second end of the metal body includes a second connector for connection to a portion of the crash bar.

7. The device of claim 6, wherein the second connector comprises a clamp.

8. A footrest mount connectable to a motorcycle frame mounting aperture for connecting a crash bar to the motorcycle frame, the footrest mount comprising:
   a metal body having a first end and a second end spaced from the first end and a linear bore extending therethrough, the first end of the metal body being connectable to the motorcycle frame mounting aperture, and a linear arm having a first end and a second end spaced from the first end, the first end of the linear arm being connected to the second end of the metal body, the linear arm extending generally transverse to the metal body, wherein the linear arm comprises a mounting aperture for a footrest, wherein the second end of the metal body comprises a connector for attaching the metal body to the crash bar.

9. The footrest mount of claim 8 wherein the first end of the metal body is connectable to the motorcycle frame mounting aperture by a threaded connector inserted in the linear bore at the second end of the metal body.

10. The footrest mount of claim 8 wherein the second end of the metal body comprises a clamp configured to clamp the second end of the metal body to the crash bar.

11. A method of attaching a footrest mount to a motorcycle having a crash bar mounted to a motorcycle frame below an engine of the motorcycle, the method comprising:
   removing a threaded connector that attaches a flange of the crash bar to a mounting aperture of the motorcycle frame;
   providing the footrest mount having a metal body and a mounting arm connected to the metal body, the metal body having a first end and a second end spaced from the first end and having a linear bore therethrough, the mounting arm connected to the second end of the metal body and extending transverse to the metal body, the mounting arm having at least one aperture for connecting a footrest assembly;
   inserting the threaded connector in the bore at the second end of the metal body and connecting the connector to the mounting aperture of the motorcycle frame; and
   connecting the second end of the metal body to a portion of the crash bar.

12. The method of claim 11 wherein a step of connecting the second end of the metal body to a portion of the crash bar comprises clamping the metal body to the portion of the crash bar.

\* \* \* \* \*